Patented July 16, 1929.

1,720,972

UNITED STATES PATENT OFFICE.

MAX Y. SEATON, OF PORTERVILLE, CALIFORNIA, ASSIGNOR TO NATIONAL KELLA-STONE COMPANY, OF CHICAGO, ILLINOIS, A CORPORATION OF DELAWARE.

METHOD OF AND MATERIAL FOR COLORING MAGNESIUM OXYCHLORIDE STUCCO.

No Drawing.   Application filed April 15, 1925.   Serial No. 23,416.

Exterior stuccoes, the essential binding material of which is magnesium oxychloride, have become widely used and compete directly with stuccoes manufactured with Portland cement as a binding material.

Such a mortar sets to a hard mass within a few hours, attains very high strength at an early age, and is so remarkably free from expansion and contraction movements, due either to temperature or humidity change, that it makes an excellent stucco coating.

Although the magnesite stuccoes are unsurpassed from a structural standpoint, they have one defect in that when an effort is made to finish the surface of such a stucco by troweling, floating, stippling or sponging, it is ordinarily impossible to obtain uniformity of color over the entire surface of a wall, for example. In working the soft surface with tools of any type, it is unavoidable that tooling of the surface draws varying amounts of magnesium chloride to the surface and it is always found that a wall, after the mechanical handling necessary to produce a float, trowel, stipple or dash finish, shows light and dark spots scattered promiscuously over the wall. In some instances such an excess of magnesium chloride is drawn to the surface that the wall actually remains wet continually for free magnesium chloride is a hydroscopic salt and will absorb moisture from fairly humid air.

When an attempt is made to produce a colored stucco by addition of mineral pigments to magnesite stucco and then to produce a trowel, float or other tooled surface, the effect above described is simply exaggerated and an unsatisfactory finished job results. As a result, it has been necessary in the past to apply a paint coating to the finished magnesite stucco wall whenever a finish of the type described above is desired. Use of a paint is not only expensive but unless a specially compounded paint is used, proper adhesion to the magnesite stucco surface may not be obtained and paint failure result at an early date. Furthermore, the texture of a painted surface is distinctly different from the stone-like texture which is ordinarily desired.

Because of the conditions above described almost all of current magnesite stucco practice employs the so-called rock dash type of finish. To produce this finish, colored natural rocks crushed to approximately ¼″ size are thrown against the soft surface of the stucco immediately after it has been applied to the wall. The stucco here requires a minimum of mechanical tooling and accordingly on setting furnishes a uniform colored background which holds the colored rock. This type of finish is not adaptable to certain architectural types of construction nor is it desired by all users. In the past, magnesite stucco practice has been confined to this type of finish or to the use of paint, with the admitted disadvantages of this last type of finish.

In contradistinction to the conditions thus found to exist when dealing with magnesium oxychloride stuccoes, it has been found possible where using a Portland cement stucco, to prepare a fairly satisfactory finish of the troweled, floated, sponge or other tooled type without the use of paint. The setting reactions of Portland cement are so different from those of magnesium oxychloride cement that reasonable uniformity of color may be realized on a surface which has had extensive mechanical working. The uniformity of color obtained, although not entirely satisfactory, is still superior to that obtainable by any of the common oxychloride mixes with color added.

It should be distinctly noted that Portland cement stucco as normally applied is always subject to cracking and checking, and it is because of the vastly superior structural properties of the magnesite stuccoes that they have become so widely used in spite of their disadvantages as to possible finish types.

Efforts have been made recently to combine the superior structural properties of the magnesite stuccoes and the fairly satisfactory colored finished properties of Portland cement, by applying a Portland cement color coat over a magnesite stucco base. But when Portland cement is mixed with water, the calcium silicates and aluminates present are hydrolyzed, giving lime in solution. Accordingly, when a Portland cement coat is applied to the oxychloride base, reaction at the contact surface immediately occurs, with formation there of a film of hydrate which tends to prevent proper adhesion of the color coat to the base. Furthermore the calcium chloride produced remains for a long period and owing to its hydroscopic action pulls moisture from the air and leads in many cases to just as severe instances of color non-uniformity as result from the use of magnesium oxychloride cements alone.

I have discovered, however, that very satisfactory color coats for an oxychloride or magnesite stucco base may be made by taking advantage of the reaction that occurs between magnesium sulphate and calcined magnesite or magnesia. The product formed directly by such reaction is a cement similar in certain respects to the one formed by mixing magnesium chloride solution with such calcined magnesite, although such magnesium oxysulphate cement is slightly inferior structurally to the magnesium oxychlorides and is not available for commercial use for stucco coatings because of its cost.

In the production of my improved oxysulphate color coat, I employ the ingredients and follow the steps hereinafter fully described and particularly pointed out in the claims, the following description setting forth in detail one mode of carrying out the invention, such disclosed mode constituting, however, but one of various ways in which the principle of the invention may be used.

The present improved oxysulphate color coat consists essentially of a mixture of calcined magnesite, magnesium sulphate and larger or smaller proportions of inert ingredients together with color as desired. Such a product when mixed with water can be applied to a magnesite stucco surface by any of the methods employed in applying a Portland cement color coat. The oxysulphate color coat sets to a moderately firm mass within a short time and continually increases in hardness with exposure to the weather. It contains no material which reacts with the oxychloride cement existing in the base stucco and inasmuch as it expands and contracts with heat and temperature change in essentially the same ratio as does the base, excellent adhesion to the base is obtained.

Magnesium sulphate and the oxysulphate cements show no hydroscopic properties and accordingly no difficulties with lack of uniformity of color over a large area are experienced. Furthermore, the oxysulphate cements seem to be able to take up and to render non-hydroscopic a certain amount of free magnesium chloride which might perhaps exist on the surface of the oxychloride stucco on walls of oxychloride stucco which show great difference in color before such color coat is applied.

In practice the magnesium oxychloride stucco is applied to a wall surface by any of the common methods, brought to a reasonably smooth and level surface and then allowed to thoroughly set and harden. This may require, depending on weather conditions, from one or two days to several weeks. As soon as the stucco is thoroughly hard and dry, the oxysulphate color coat may be applied to it either by spreading with a trowel as a thin coat and then tooling to any desired surface or by casting on as a splatter dash. No further treatment of the wall is required.

A typical oxysulphate color coat would contain 15 per cent of plastic calcined magnesite, 10 per cent of hydrated magnesium sulphate or Epsom salts, 25 per cent marble dust or ground silica, and 50 per cent of coarse marble, coarse silica or fine sand, together with from .1 to 5 per cent of iron oxide, ochre, umber, carbon black or other desirable coloring pigment. If desired, magnesium sulphate could be omitted from the mix and later used as a solution for mixing with the dry ingredients directly before application. Use of the magnesium sulphate in dry form is convenient but not essential to the success of the method.

It is understood that the proportions of the various ingredients given in the typical formula could be varied within wide limits and that any material generally considered as a substitute for any of the ingredients, might be employed. Further, the properties of the color coat may be varied considerably by varying the nature of the calcined magnesite which is employed which through proper manufacturing methods may be obtained in such form that it reacts either very rapidly or very slowly with magnesium sulphate. The ordinary commercial calcined magnesite widely used for preparation of oxychloride cements will give quite satisfactory results, but it is possible to impart particular properties through variation in calcined magnesite nature in the manner familiar to one skilled in the art.

Other modes of applying the principle of my invention may be employed instead of the one explained, change being made as regards the process herein disclosed or the materials employed in carrying out the process, provided the ingredients or steps stated by any of the following claims or the equivalent of such stated ingredients or steps be employed.

I therefore particularly point out and distinctly claim as my invention:—

1. In a method of treating stuccoes and the like composed of magnesium oxychloride cement, the step which consists in applying to such stucco a magnesium oxysulphate coating capable of correcting non-uniformity in the stucco.

2. In a method of coloring stuccoes and the like composed of magnesium oxychloride cement, the step which consists in applying thereto a watery mixture of magnesia, magnesium sulphate and a suitable pigment.

3. In a method of coloring stuccoes and the like composed of magnesium oxychloride cement, the step which consists in applying thereto a watery mixture of magnesia, magnesium sulphate and inert material.

4. In a method of coloring stuccoes and the like composed of magnesium oxychloride cement, the step which consists in applying thereto a watery mixture of magnesia, magnesium sulphate, inert material and a suitable pigment.

5. In a method of treating stuccoes and the like composed of magnesium oxychloride cement, the step which consists in applying thereto a mixture containing 10 to 20 per cent of calcined magnesite, and 5 to 15 per cent of a reactive sulphate, together with suitable amounts of inert material.

6. In a method of coloring stuccoes and the like composed of magnesium oxychloride cement, the step which consists in coating the dry surface thereof with a watery mixture of approximately ten (10) per cent of plastic calcined magnesite, ten (10) per cent of hydrated magnesium sulphate, seventy-five (75) per cent of inert material and from one-tenth of one (0.1) to five (5) per cent of a suitable pigment.

7. In a method of coloring stuccoes and the like composed of magnesium oxychloride cement, the step which consists in coating the dry surface thereof with a watery mixture of approximately ten (10) per cent of plastic calcined magnesite, ten (10) per cent of hydrated magnesium sulphate, twenty-five (25) per cent of relatively fine inert material, fifty (50) per cent of relatively coarse inert material, and from one-tenth of one (0.1) to five (5) per cent of a suitable pigment.

Signed by me this 9th day of April, 1925.

MAX Y. SEATON.